March 31, 1959    M. L. HARBAUGH ET AL    2,880,064
PROCESS FOR MANUFACTURE OF SULFAMIC ACID
Filed Sept. 26, 1955
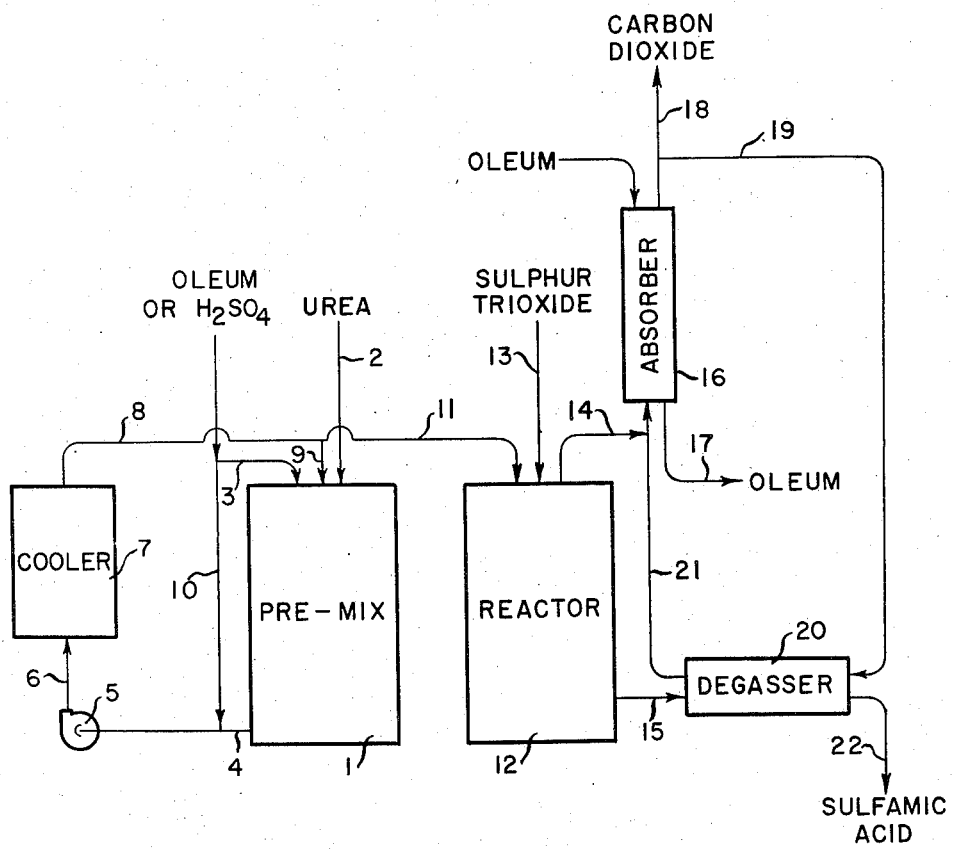
INVENTORS
MAX L. HARBAUGH
GEORGE A. PEIRCE
BY *Ernest H. Beck*
ATTORNEY

2,880,064

PROCESS FOR MANUFACTURE OF SULFAMIC ACID

Max L. Harbaugh, Cranford, and George A. Peirce, Westfield, N.J., assignors to E. I. du Pont de Nemours and Company, Wilmington, Del., a corporation of Delaware Application September 26, 1955, Serial No. 536,504

1 Claim. (Cl. 23—166)

This invention relates to the manufacture of sulfamic acid from the reactants urea, sulfuric acid, and sulfur trioxide. More particularly, it is directed to processes in which said reactants, ordinarily after partial reaction of them or some of them without substantial formation of sulfamic acid, are heated at about 75° C. to 85° C. to form sulfamic acid and the sulfamic acid so formed is thereafter agitated in the presence of a stream of inert gas.

It has heretofore been known that sulfamic acid can be produced from urea, sulfuric acid, and sulfur trioxide with the formation of carbon dioxide as a by-product. The following equation illustrates the overall reaction:

$$CO(NH_2)_2 + H_2SO_4 + SO_3 \rightarrow 2NH_2SO_3H + CO_2$$

Various techniques have been suggested or used for carrying out the manufacture of sulfamic acid according to the equation given above. According to U.S. Patent 2,390,648, the urea, sulfuric acid and sulfur trioxide reactants are first brought together while cooling to inhibit formation of sulfamic acid and give a liquid reaction medium made up of these components or intermediate reaction products thereof. The liquid mass so formed is subsequently converted to sulfamic acid. U.S. 2,409,572 teaches an improvement of the latter process particularly with respect to manipulative techniques for controlling temperature during the initial or premix portion of the process.

U.S. Patent 2,436,658 teaches another method in which the urea and sulfuric acid reactants are first brought together to form an intermediate reaction product and that product is in turn reacted with sulfur trioxide with cooling and the resulting mass subsequently converted to sulfamic acid.

U.S. Patent 2,408,492 shows a method for forming sulfamic acid in which the urea, sulfuric acid and sulfur trioxide reactants are added to a solid pulverulent diluent in such amounts that the reaction mass remains apparently dry, the sulfamic acid being formed in the apparently dry mass.

The aforementioned prior art techniques can be used in the commercial manufacture of sulfamic acid. Unfortunately, their use heretofore has resulted in the production of a sulfamic acid of quality insufficient to render it saleable for most purposes without further purification operations. Thus the product obtained has ordinarily contained up to about 90% sulfamic acid, and under exceptionally favorable conditions up to about 93% sulfamic acid.

We have now found improved methods which, though preferably incorporating one or more of the above described techniques, combine new conditions and steps to provide for the first time the production in a commercial operation of sulfamic acid that is directly saleable without purification, a product containing 95% or more sulfamic acid.

The desired high quality sulfamic acid product is obtained according to the present invention by carrying out the operation in which the sulfamic acid itself (as distinguished from premix operations to make intermediates) is formed at a temperature controlled within the range of about 75° C. to 85° C. and thereafter agitating the sulfamic acid so formed in a stream of an inert gas.

In the practice of the invention, some or all of the three reactants urea, sulfuric acid and sulfur trioxide can be brought together if desired in preliminary mixing or reacting steps prior to the operation of heating at 75° C. to 85° C. to form sulfamic acid. For example, one can advantageously use a premix operation of the kind described in the aforementioned U.S. Patents 2,390,648 and 2,409,572 to form a liquid intermediate reaction product of urea, sulfuric acid and sulfur trioxide by bringing those reagents together with cooling to inhibit formation of sulfamic acid; or the partial premix operation disclosed in the aforementioned 2,436,658 in which the urea and sulfuric acid are first reacted and that reaction product is subsequently brought together with sulfur trioxide.

Processes of the invention will be better understood by reference to the drawing in which a preferred process is illustrated by means of a modified flowsheet.

Having reference to the drawing, there will be seen a premix vessel 1. The premix vessel has an inlet pipe 2 for the introduction of urea and an inlet pipe 3 for the introduction of oleum or sulfuric acid. It is also provided with an outlet pipe 4 for withdrawing reacting liquid medium by means of pump 5 and pipeline 6 thru cooler 7 for recycle by means of pipelines 8 and 9 to the premix vessel. A pipe 10 is also shown to permit introduction of a part or all of the oleum or sulfuric acid, as the case may be, just ahead of the intake side of pump 5.

The equipment described above is adapted for carrying out preferred premixing operations of the kind mentioned briefly heretofore in which all three reactants are first brought together or alternatively in which only the urea and sulfuric acid are first mixed.

In carrying out a premix operation in which all three reactants are brought together, the urea and oleum should be brought together in proportions to provide substantially one mol of sulfuric acid for each mol of urea. The closer the ratio of sulfuric acid to urea is to exactly mol per mol, the better the quality of the product, other conditions being equal. If an excess of sulfuric acid is used it turns up as impurity in the crude product. If the sulfuric acid is deficient, the product contains unreacted urea or urea decomposition products.

It is preferred that any oleum used in the premix step not exceed about 51% oleum. Preferably, the oleum feed is of a strength in the range of about 45% to 48% oleum altho much lower concentrations, as low as 10% oleum, or even lower, can be used if desired. Use of oleum of strength higher than about 51% in such a premix operation is impractical in large scale commercial operation in the absence of exceptional cooling and temperature control means because of extreme viscosity of the reacting mass and the dangers of out-of-control and even explosive reaction conditions existing.

In using a premix operation in which urea and oleum (i.e., $H_2SO_4 + SO_3$) are first brought together, the reacting mass is cooled to inhibit the formation of carbon dioxide and thereby suppress the production of sulfamic acid. This is done by maintaining the temperature of the reacting mass below about 50° C., preferably within the range of about 20° C. to 40° C., and more preferably within the range of about 25° C. to 35° C.

Much heat is liberated in a premix step in which the urea and oleum reactants are brought together and hence the rate at which those reactants can be brought together while still maintaining the required cooling to suppress formation of sulfamic acid is dependent in large measure upon the provisions made in the processing equipment for abstracting heat from the reacting mass.

In the drawing, there is shown a practical method for maintaining the necessary temperature control in a process in which oleum and urea are first brought together in a premix reaction. According to the method there illustrated, a relatively large body of liquid which has previously been prepared from oleum and urea with cooling is maintained in premix vessel 1, which vessel is equipped with an agitator, not shown, and also is preferably equipped with cooling means. A portion of this body of liquid is continuously being withdrawn and cycled thru external cooler 7 which is designed to be capable of removing all or at least the bulk of the heat liberated in the reaction. This technique is well adapted to maintain the necessary temperature control. It will be apparent to those skilled in the art, however, that other apparatus and techniques can be used for carrying out such a premix operation keeping in mind the essential requirement that cooling capacity be sufficient to suppress the formation of sulfamic acid in that stage at the particular rates at which the oleum and urea reactants are being brought together.

It is also apparent that if an oleum-urea premix type of operation is to be carried out that the separate addition of sulfuric acid and sulfur trioxide can be used instead of part or all of the oleum and that such operation is the equivalent of the use of oleum since oleum is but a solution of sulfur trioxide in sulfuric acid.

Instead of forming a premix of all three sulfamic acid forming reactants, namely, urea, sulfur trioxide and sulfuric acid, one can, as illustrated in the drawing, first bring together urea and sulfuric acid, the sulfuric acid being added rather than oleum thru lines 3 and 10, or either of them.

Turning now to the next operation in the preferred methods illustrated in the drawing, it will be seen that there is a pipeline 11 thru which cooled liquid reacting mass from the first stage, after having passed thru cooler 7 and pipelines 8 and 11, flows into reactor 12. In preferred continuous operations, especially if the urea-oleum premix technique is used, only a portion of the volume of liquid passing thru cooler 7 passes thru pipeline 11 into reactor 12, the major part of that liquid being returned thru pipe 9 to premix vessel 1.

Reactor 12 is equipped with an agitator and cooling means, not shown, with an inlet pipe 13 for the introduction of sulfur trioxide, a vent line 14 for removal of gases, and a transfer or conveyor means 15 for withdrawing particulate solid sulfamic acid from the reactor.

In the reactor, the conversion to sulfamic acid is carried out at a temperature maintained within the range of about 75° C. to 85° C., and most preferably at about 80° C.

In carrying out processes of the invention, sulfur trioxide is ordinarily added to the reactor. Provision for such addition is shown by pipeline 13 in the drawing. As will be appreciated, if the urea and sulfuric acid reactants only are brought together in a premix operation, then the total amount of sulfur trioxide to be used is introduced via pipeline 13. Similarly, all the sulfur trioxide is similarly introduced into the reactor if the sulfamic acid manufacturing process is carried out without prior formation of a premix in which case the urea and sulfuric acid are also added directly to the reactor. If, on the other hand, urea and oleum are first brought together in a premix operation, then added sulfur trioxide is introduced as required thru pipeline 13 to bring the total sulfur trioxide to the desired quantity.

Best results are obtained by adding at least 10% of the total amount of sulfur trioxide introduced into the process directly into reactor 12 as by means of pipeline 13. Also preferably, the total amount of sulfur trioxide introduced into the overall process is at least 30%, and more preferably from 30% to 40%, more than the amount stoichiometrically required to react with urea and sulfuric acid to form sulfamic acid. In other words, the total amount of $SO_3$ introduced into the process (i.e., the sum of the amount introduced in any premix operation and the amount added in the sulfamic acid forming reaction step) is at least 1.3 mols and preferably 1.3 to 1.4 mols for each mol of urea. Of course, more than 40% excess sulfur trioxide, up to 100% excess or more, can be used if desired, but then larger sulfur trioxide recovery facilities are required or large sulfur trioxide losses result.

In preferred processes of the invention, the step of forming sulfamic acid by heating at 75° C. to 85° C. in reactor 13 is carried out by bringing together the sulfamic acid forming components on the surfaces of a body of agitated particulate solid which is inert under the conditions existing in the reactor, such as talc, pyrophyllite and like diluents, and preferably sulfamic acid previously formed, maintained at a temperature of 75° C. to 85° C., and controlling the rate of addition of sulfamic acid-forming components to the reactor so that the mass upon or within which the sulfamic acid forms remains apparently dry and without the presence of any substantially continuous liquid phase.

Alternatively, other techniques for effecting the formation of sulfamic acid at 75° C. to 85° C. in the reactor can be used. For example, instead of using a pulverulent solid as a diluent in the reactor, one can carry out the reaction using a body of liquid diluent, for example, liquid sulfur trioxide. The use of a body of liquid sulfur trioxide as a diluent in the reaction step has advantages since it provides the presence of excesses of the sulfur trioxide reactant and temperature control can be simplified and cooling provided by permitting vaporization of sulfur trioxide, as required, with its concomitant cooling effect.

As pointed out heretofore, at the 75° C. to 85° C. temperature employed in the reactor, sulfamic acid is formed with liberation of carbon dioxide. Referring again to the embodiment shown in the drawing, there will be seen a method for treatment of effluent gases from the reactor to recover sulfur trioxide and carbon dioxide and for further processing of the sulfamic acid produced in the reactor to obtain high quality technical sulfamic acid.

The effluent gases containing carbon dioxide and sulfur trioxide are removed thru pipeline 14 and passed countercurrent to oleum or sulfuric acid to form stronger oleum or stronger sulfuric acid which is withdrawn thru pipeline 17. Corrosion problems are minimized by using oleum and preferably about 30% oleum as the absorbent liquid fed to absorber 16.

Carbon dioxide which passes thru absorber 15 is in part vented thru pipeline 18 and in part cycled by pipeline 19 to degasser 20. In degasser 20, the cycled carbon dioxide is passed countercurrent to sulfamic acid withdrawn from reactor 12 by conveyor means 15. Sulfamic acid withdrawn from the reactor is admixed with a significant amount of sulfur trioxide, the amount varying, of course, with the particular manipulative technique and proportions of materials used in carrying out the sulfamic acid-forming reaction at 75° C. to 85° C. in reactor 12. By passing sulfamic acid withdrawn from reactor 12 countercurrent to carbon dioxide in degasser 20, much to substantially all of the sulfur trioxide can be removed, the amount removed depending largely, as will be apparent to those skilled in the art, upon the design and operation of the degasser apparatus.

The degasser can be any type of equipment designed for commingling pulverulent solids and gases in countercurrent flow. A ribbon or screw-type conveyor is well suited for such use.

Best results are obtained in the degasser by maintaining the sulfamic acid passing therethru at a temperature within the range of about 45° C. to 95° C., and more preferably 80° C. to 95° C. Temperatures below 45° C. can be used, if desired, at the expense of a loss in degassing rate. Temperatures somewhat above 95° C. can also be used but tend with increasing temperatures to degrade the sulfamic acid product.

Effluent gases from degasser 20 are returned thru pipeline 21 to absorber 16 for removal of sulfur trioxide therefrom. Product sulfamic acid is withdrawn from the degasser by conveyor means 22.

While the drawing illustrates a preferred continuous method for carrying out processes of the invention, it will be apparent to those skilled in the art that the practice of the invention is not necessarily limited to such a continuous operation nor necessarily to the type and arrangement of equipment disclosed in the drawing.

The invention is further illustrated by the following detailed examples in addition to the examples given above.

*Example 1*

Starting with empty equipment, as illustrated in the drawing, there is charged into premix tank 1 3,000 parts by weight of oleum of 48% strength. The agitator in the premix tank, not shown, and pump 5 are started with care being taken to assure that the temperature of the coolant in cooler 7 is above 34° C. so that the 48% oleum does not solidify. Gradual addition of urea to the premix tank is then started. The rate of addition of the urea is so correlated to the cooling capacity of the equipment as to maintain a temperature in the premix mass of 35° C. to 40° C. As the urea is added, the freezing point of the oleum drops rapidly. Thus as soon as the urea addition is started, the temperature in the cooler can be dropped and the rate of addition of urea increased accordingly. A total of 956 parts by weight of urea are added in this operation of forming an initial premix liquid.

The agitator in reactor 12 is started and the reactor is charged to about 10% of its capacity with approximately 1500 parts by weight of dry crude sulfamic acid of previous manufacture and the sulfamic acid is heated to 80° C.

Simultaneous addition of urea and 48% oleum is then started thru lines 2 and 3 respectively to the premix liquid in tank 1. The urea and 48% oleum are added in a weight ratio of 3.14 parts of oleum for each part of urea to provide a molar ratio of one mol of urea to one mol of sulfuric acid to 1.13 mol sulfur trioxide.

The simultaneous addition of premix liquid thru pipeline 11 and sulfur trioxide thru pipeline 13 is started to reactor 12. Sulfur trioxide is added at the rate of 0.22 mol for each mol of urea being added to the premix tank thus raising the total quantity of sulfur trioxide introduced into the operation to 1.35 mol for each mol of urea. The feed rates of the urea and 48% oleum to premix tank 1 and of the premix liquid and liquid sulfur trioxide to reactor 12 are continuous and are correlated with the coolant to maintain both constant volume of the reacting masses and constant temperature. The temperature of the premix liquid in premix tank 1 is maintained in the range of 35° C. to 45° C. and preferably at 40° C. The reacting mass in reactor 12 is maintained within the range of 75° C. to 85° C. and for the most part at about 80°±1° C.

In the sulfamic acid forming reaction which takes place in reactor 12, one mol of carbon dioxide is liberated for each mol of sulfamic acid formed. The off-gas from sulfur trioxide and small quantities of suspended sulfamic acid dust is removed thru pipeline 14 and passed counter current to 30% oleum in absorber 16 to recover the sulfur trioxide and sulfamic acid in the oleum. The gas withdrawn from absorber 16 thru lines 18 and 19 is essentially carbon dioxide.

Pulverulent sulfamic acid is continuously discharged from reactor 12 and conveyed to degasser 20, a closed vessel equipped with an agitator, wherein the sulfamic acid is agitated while being contacted with a countercurrent stream of carbon dioxide supplied thru pipeline 19 from absorber 16. The amount of sulfamic acid in degasser 20 is maintained at about constant volume and the average retention time of sulfamic acid in the degasser is 90 minutes. The average temperature of the sulfamic acid in the degasser is maintained at about 80° C.

Carbon dioxide is cycled from absorber 16 thru degasser 20 in amount required to maintain a partial pressure of sulfur trioxide in the effluent gases from degasser 20 of about 40 to 45 mm. Hg. The effluent gases are passed thru line 21 to the absorber to recover sulfur trioxide therefrom.

The product sulfamic acid which is continuously discharged from degasser 20 is a granular, free-flowing solid having an average strength of over 96.0% sulfamic acid.

*Example 2*

The process of this example is carried out in the same equipment as that of Example 1 and in like manner and under like conditions with the following exceptions:

(1) 1590 parts by weight of 98% sulfuric acid are added initially to the premix tank in place of the 3,000 parts by weight of oleum initially added to premix tank 1 in Example 1.

(2) The temperature of the mass in premix tank 1 is maintained at about 70° C. thruout the operation instead of the lower temperatures used in Example 1.

(3) Urea and 98% sulfuric acid (the sulfuric acid in place of the oleum of Example 1) are added simultaneously and continuously to premix tank 1 at approximately equimolar proportions after the initial premix batch has been prepared.

(4) Liquid sulfur trioxide addition to reactor 12 is at the rate of 1.38 mols for each mol of urea being fed to the premix tank 1 instead of 0.22 mol per mol of urea as in Example 1.

The sulfamic acid product obtained by the process of this example is a granular, free-flowing solid containing more than 95% sulfamic acid.

The foregoing detailed description has been given for clearness of understanding only and no unnecessary limitations are to be understood therefrom. The invention is not limited to the exact details shown and described for obvious modifications will appear to those skilled in the art.

We claim:

In the process for manufacturing sulfamic acid by mixing approximately equimolar quantities of urea and sulfuric acid to form a liquid mass, then agitating the liquid mass with sulfur trioxide in contact with a body of solid pulverulent sulfamic acid whereby sulfamic acid is formed and carbon dioxide liberated, with the liquid and solid pulverulent sulfamic acid being brought together in proportions so that the resulting mix remains apparently dry containing substantially no continuous liquid phase, said sulfur trioxide being added to bring the total amount of sulfur trioxide introduced to at least 30% more than the amount stoichiometrically required to react with the urea-sulfuric acid reaction product to form sulfamic acid, the steps comprising (1) agitating said liquid mass with sulfur trioxide at a temperature of about 80° C., and (2) withdrawing from the reaction zone a portion of the thusly formed sulfamic acid and thereafter agitating said sulfamic acid in the presence of a stream of inert gas.

References Cited in the file of this patent

UNITED STATES PATENTS

| | | |
|---|---|---|
| 2,297,300 | Hardesty et al. | Sept. 29, 1942 |
| 2,408,823 | Tauch | Oct. 8, 1946 |
| 2,409,572 | Leonard | Oct. 15, 1946 |
| 2,419,618 | Wilson | Apr. 29, 1947 |
| 2,436,658 | McQuaid | Feb. 24, 1948 |

FOREIGN PATENTS

| | | |
|---|---|---|
| 589,662 | Great Britain | June 26, 1947 |
| 460,262 | Canada | Oct. 11, 1949 |